UNITED STATES PATENT OFFICE.

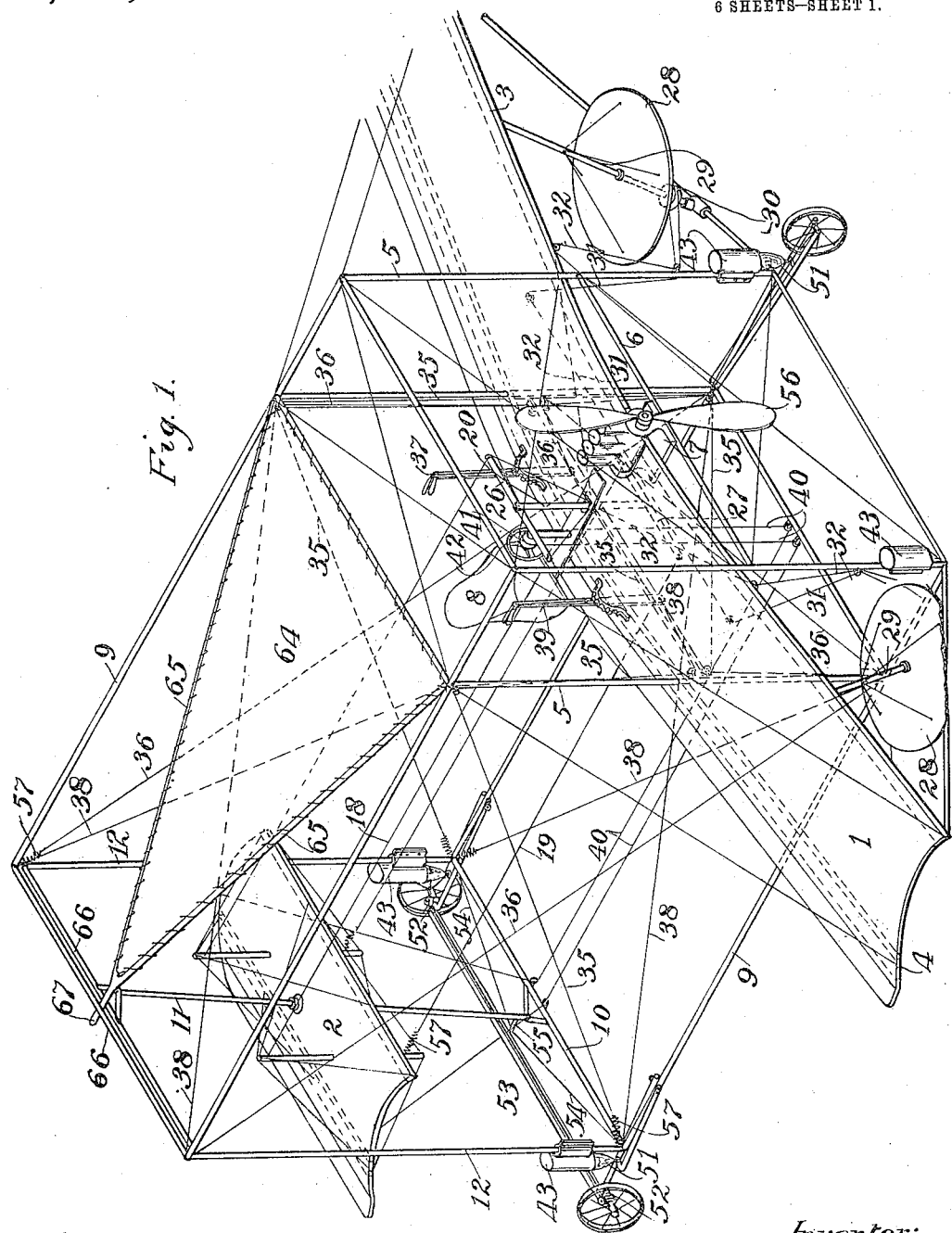

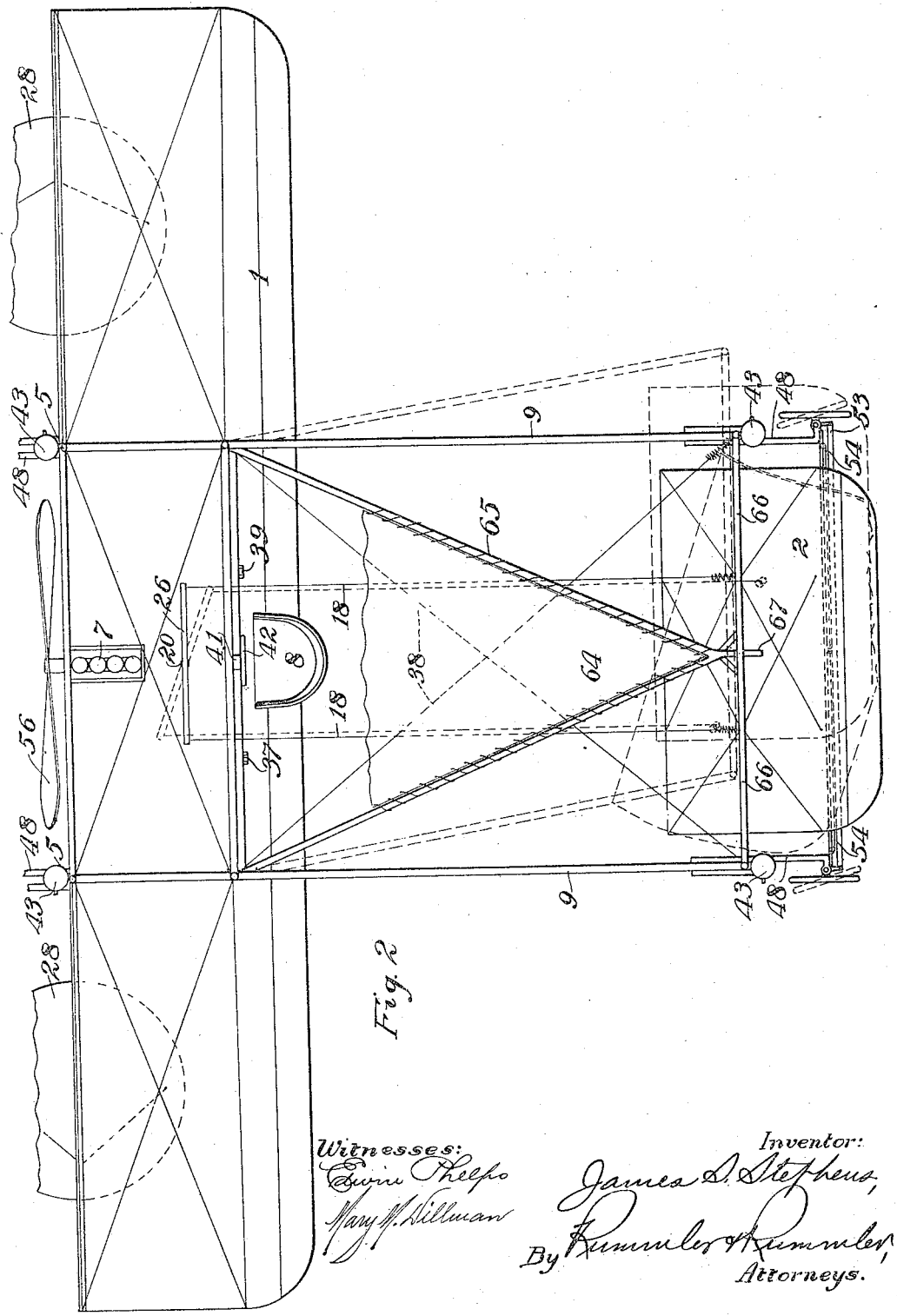

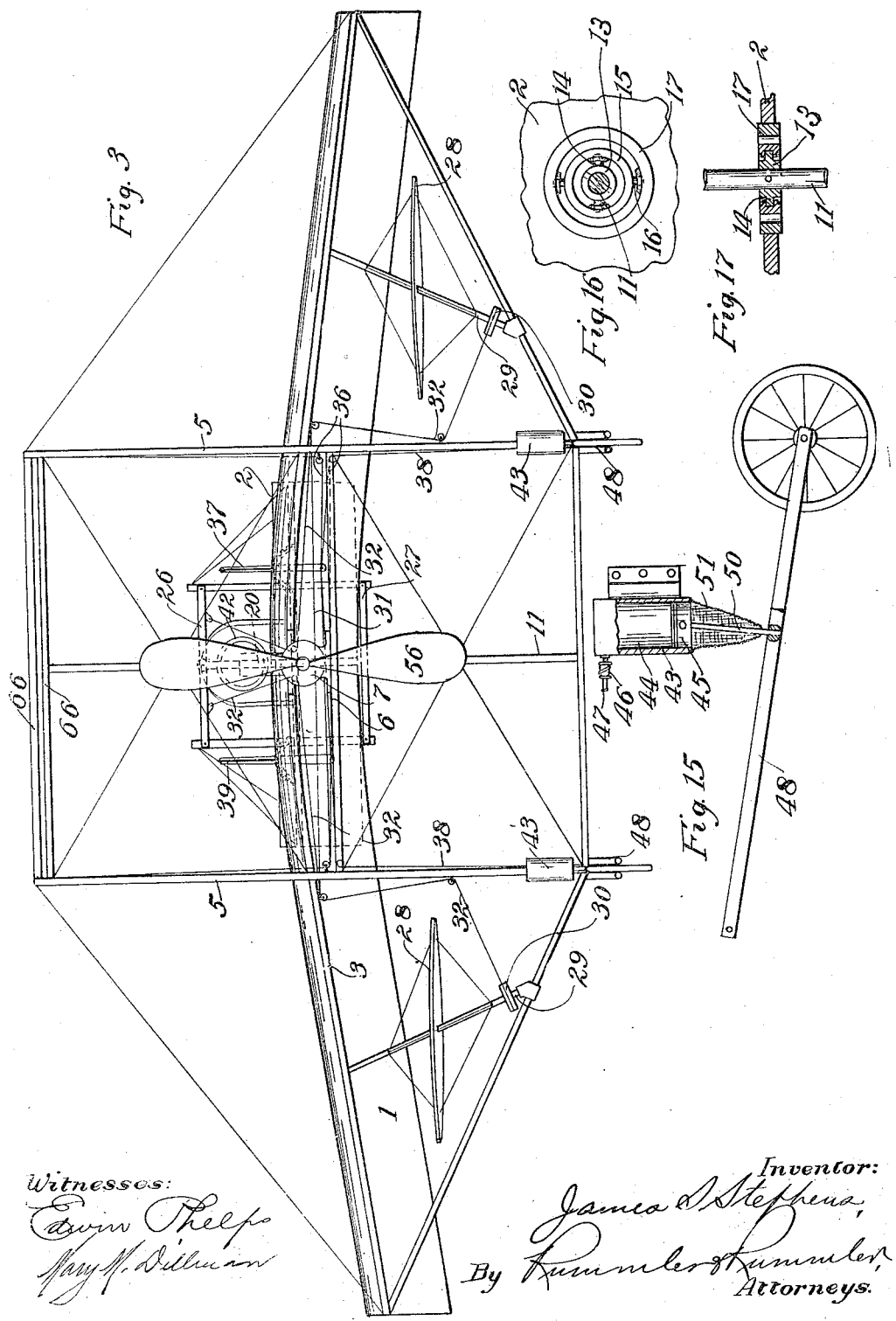

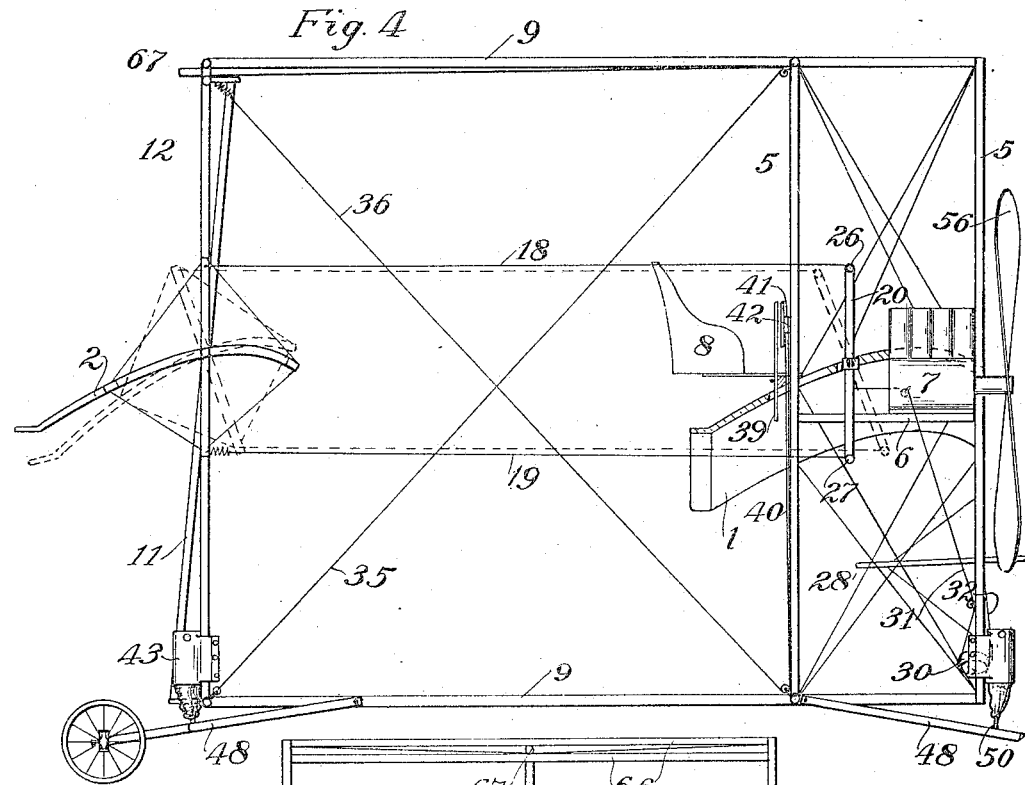
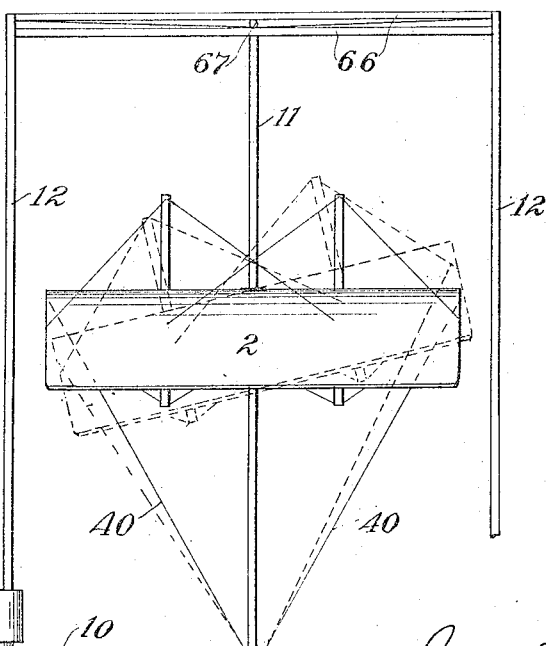

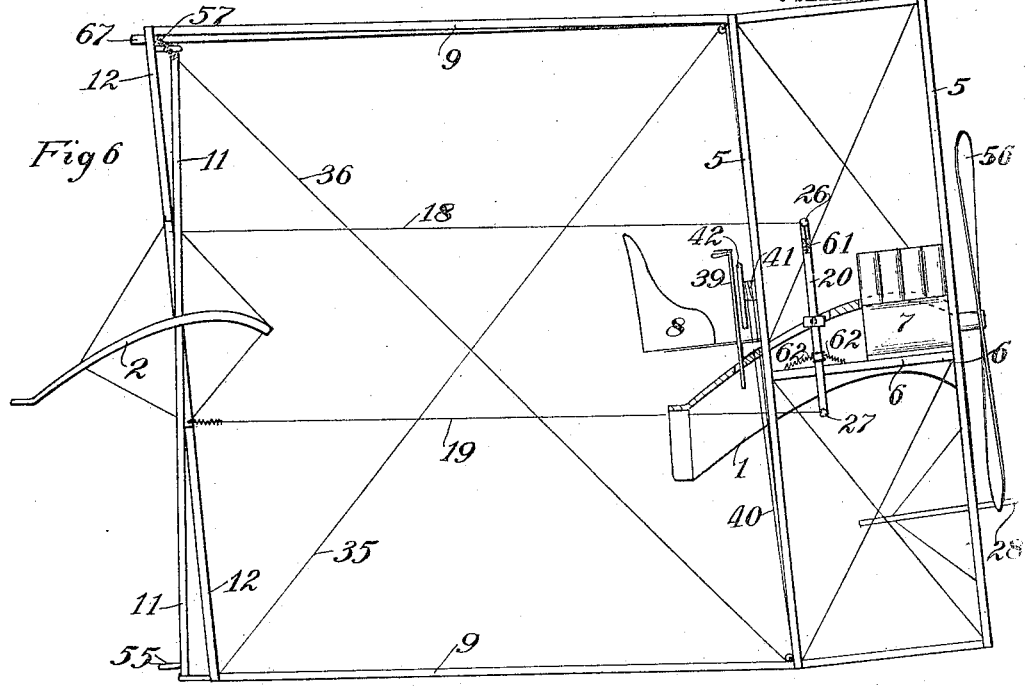
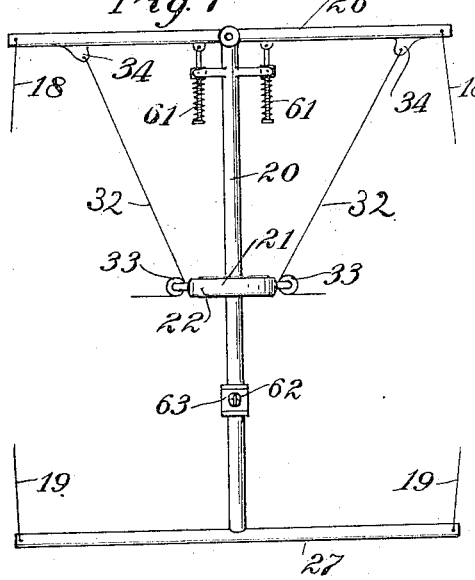
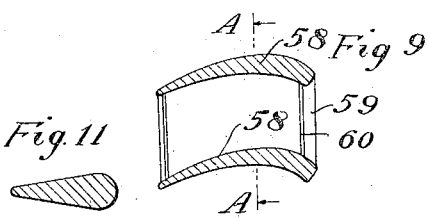
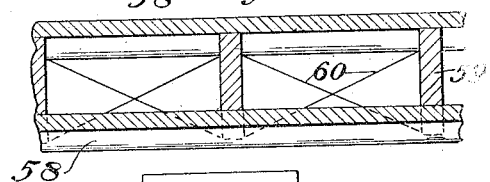
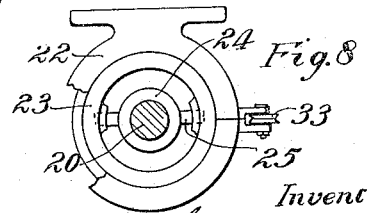

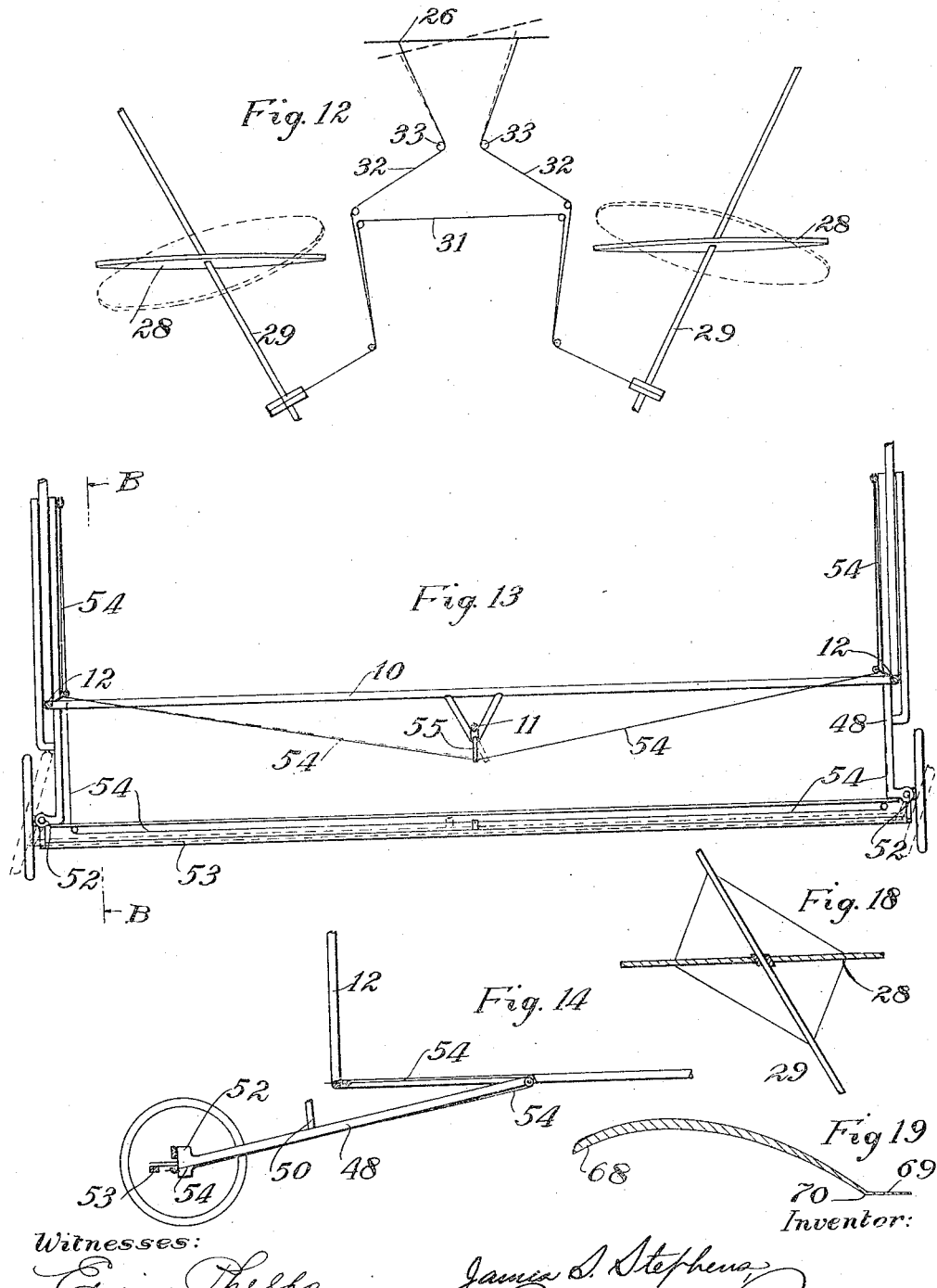

JAMES S. STEPHENS, OF CHICAGO, ILLINOIS.

FLYING-MACHINE.

1,125,202.                Specification of Letters Patent.        Patented Jan. 19, 1915.

Application filed March 7, 1910. Serial No. 547,786.

*To all whom it may concern:*

Be it known that I, JAMES S. STEPHENS, a citizen of the United States of America, and a resident of Chicago, county of Cook, State of Illinois, have invented certain new and useful Improvements in Flying-Machines, of which the following is a specification.

The main objects of this invention are to provide an improved form of aerial vehicle or flying machine of the "heavier than air" type; to provide improved means for maintaining the equilibrium of such devices and for steering the same; to provide an improved form of frame structure whereby the aeroplanes or supporting surfaces may be adjusted to different angles with respect to each other and whereby the steering operation may be accomplished entirely by movements of the supporting surfaces themselves without the use of vertically disposed fins or rudders; and whereby the steering operation may be accomplished without introducing resistances tending to retard the advance of the machine or produce side drift when a wind is blowing across the line of flight; to provide an improved method of mounting the aeroplanes or other supporting members with respect to the load carrying body of the machine whereby they may be turned to different angles of incidence with respect to the direction of travel either in unison or relative to each other without changing the attitude of the load supporting body; and to provide an improved method of mounting the steering plane of an aeroplane vehicle so as to permit said steering plane to be shifted bodily upward and downward or sidewise with respect to the main aeroplane, to be swung about a vertically disposed axis, to be tilted about a transverse horizontally disposed axis to change its angle of incidence as compared with that of the main aeroplane, to be tilted about a longitudinal horizontally disposed axis, or to have a direct motion which is the resultant or combination of several or all of such movements.

Further objects are to provide improved mechanism whereby all of the manipulation of the various balancing, steering and controlling devices may be accomplished by simple movements of a minimum number of parts in a manner which is most natural for the operator in accommodating the position of his body to changes in the level of the load supporting body of the machine, and whereby the operator may, by the manipulation of a single controlling member or lever accomplish any of the operations which are required for maintaining lateral balance, for steering the vehicle both on the ground and in the air, and for steering both upwardly and downwardly and laterally when the vehicle is in the air.

Further objects of this invention are to provide certain improvements in aerial vehicles whereby the supporting aeroplanes will normally assume positions tending to support the vehicle in equilibrium so as to avoid the possibility of accident in case, for any reason, the operator loses control or accidentally or intentionally releases some of the parts of the controlling mechanism; to provide improved means tending to maintain the frame in a certain position with respect to the horizontal, and also adapted to cause the vehicle to assume a gliding position so that it may safely descend to the earth in case of accident to the propelling mechanism, and so that the vehicle cannot settle straight downward, but must descend with a forward gliding movement which will give sufficient headway to render the steering devices operative and thereby keep the vehicle continually under control of the operator.

Further important objects of this invention are to provide an improved construction of the various compression elements or struts which make up the trusses of the main supporting frame, so that the resistance offered to the advance of the machine by such of these elements which are horizontally disposed and extend transversely to the line of flight will contribute toward the support of the vehicle on the air; to provide an improved form of alighting gear comprising improved air cushion devices for absorbing shocks and capable of being pumped up to provide any desired resistance to compression; and to provide improved structural arrangements whereby slack in the operating lines or cables will be automatically taken up and prevented; and to provide improved means for absorbing the shocks which might arise upon alighting upon the ground.

A specific construction for carrying out these objects and illustrating the invention as applied to a flying machine of the monoplane type is shown in the accompanying drawings, in which:—

Figure 1 is an isometric perspective of the complete machine, some of the parts being partly broken away. Fig. 2 is a top plan of the same, some of the parts which extend forward of the front aeroplane being partly broken away. Fig. 3 is a front elevation of the same. Fig. 4 is a side elevation of the same, the front aeroplane being shown in section. Fig. 5 is a rear elevation of the steering or guiding aeroplane and some of the adjacent parts of the body frame. Fig. 6 is a side elevation showing the body frame racked as for simultaneously changing the angles of incidence of the aeroplanes. Fig. 7 is a front elevation of the mechanism whereby the operator manipulates the steering plane and the ailerons. Fig. 8 is a top plan of the bearing in which the controlling lever is mounted. Fig. 9 is a detail illustrating the sectional form of the horizontally disposed compression members of the frame structure. Fig. 10 is a fragmentary longitudinal section of the same, the plane of section being indicated by the line A—A in Fig. 9. Fig. 11 is a detail indicating the sectional form of the vertical compression members. Fig. 12 is a front elevation illustrating diagrammatically the arrangement of the ailerons and the mechanism for operating them. Fig. 13 is a fragmentary detail, showing in top plan the rearward portion of the alighting and land steering gear. Fig. 14 is a fragmentary section of the same on the line B—B of Fig. 13. Fig. 15 is a detail of the alighting gear. Fig. 16 is a top plan detail of the joint between the steering plane and its support. Fig. 17 is a sectional detail of the same. Fig. 18 is a sectional detail of one of the ailerons. Fig. 19 is a detail showing a preferred form of aeroplane section, the section being taken in a plane parallel with the line of flight.

In the form shown in the drawings, the vehicle is supported on the air by a main supporting aeroplane or wing surface 1, and a second supporting aeroplane 2, which serves as a steering surface. These surfaces are connected together by a suitable trussed frame structure, and each is mounted in the frame so as to lie substantially horizontal but slightly inclined from front to rear to present the proper angle of incidence to the air to produce the desired lifting effect during flight. These planes may of course be made continuous or be subdivided to suit any particular features of design, and they may also be of any suitable shape.

In the drawings, the main plane 1 is shown of arched or dihedral form in the direction of its length which is at right angles to the line of flight, and both planes are shown with the usual downwardly concave or parabolic curvature. The planes are braced by a suitable system of trussing. Each plane is formed of fabric stretched upon a suitable frame structure which is not shown in detail in the drawings. The frame structure of the main or front aeroplane includes a pair of strong compression members 3 and 4, extending from end to end of the wing surface, and the fabric is supported at suitable intervals by ribs or frames extending across the members 3 and 4.

In the form shown, the front aeroplane is supported by a rigid truss which comprises, besides the members 3 and 4, a plurality of upright masts or struts 5 and suitable braces. The struts 5 support at a suitable elevation, a horizontal frame 6 which carries the motor 7, the operator's seat 8, and some of the parts of the operating mechanism. The steering plane 2 is constructed in a similar manner and has a rigid truss to brace it.

The steering plane 2 and its truss are mounted a considerable distance rearward from the main plane 1, and are mounted to swing about a vertically disposed axis and also about transverse and longitudinal axes. The terms "longitudinal" and "transverse" will be hereinafter used as referring to directions with respect to the normal line of flight of the vehicle rather than with respect to the length or breadth of individual aeroplanes. The movement about the vertically disposed axis is for the purpose of steering the vehicle in a horizontal plane during flight, as will be hereinafter described. The movement about the transverse horizontal axis is for the purpose of steering in a vertical plane and for maintaining the fore and aft balance of the vehicle by varying the lifting effect of the plane 2, and the movement about the fore and aft horizontal axis is for compensating for the effect of side slants of wind and also for steering sidewise and for causing the vehicle to descend or rise in a spiral course when soaring. The plane 2 is also mounted so that it may be raised or lowered relatively to the plane 1 without altering its angle with respect to the plane 1, a movement which is particularly useful when alighting. The plane 2 is also capable of being moved bodily toward either side of the line of flight without changing its angular position with respect to the plane 1 or its angular relation to the line of flight for securing lateral balance when the wind blows across the line of flight.

In the form shown in the drawings, the body frame comprises a parallelepiped which may be racked both vertically and horizontally. This is accomplished by making the corner members in the form of struts suitably braced to form rigid front and rear frames and by having the longitudinal strut members 9 hinged to the front and rear frames, and by providing diagonal braces for the top, bottom and sides, which are capable of being adjusted by the operator to rack the body frame.

The rear frame 10 of the body frame is provided with an upright rotatable member 11 located midway between the upright struts 12 thereof, and it is this member 11 which carries the plane 2 and its truss. About midway of the height of the member 11 is a collar 13, Figs. 16 and 17, which is secured to and rotatable with the member 11, and which has trunnions 14 journaled in suitable bearings on a ring 17 forming part of the framework.

The steering movements of the plane 2 are controlled by four cables 18 and 19, which have their rearward ends connected at points spaced apart vertically and horizontally as at the four corners of a square having its center in the center of movement of the plane 2.

The main controlling element, by means of which the operator accomplishes the steering movements of the surface 2, is illustrated in Figs. 7 and 8, and comprises an upright lever 20 carried by a bearing 21 on the main truss of the plane 1. This bearing comprises a stationary member 22 within which a ring 23 is journaled to rotate about a vertical axis. A gimbal 24 is rigidly fastened concentrically to the lever 20 and has trunnions 25 extending horizontally at right angles to the line of flight and journaled in the ring 23. The upper end of the lever 20 is forked and has a handle bar 26 mounted thereon so as to be capable of being tilted laterally. At the lower end of the lever 20 is a cross-bar 27. The handle bar 26 and the cross-bar 27 are preferably of equal length and are spaced apart equally distant from the bearing 21. The extremities of the handle bar 26 are connected to the forward ends of the cables 18 and the extremities of the cross-bar 27 are connected to the forward ends of the cables 19.

In order to facilitate lateral balancing of the vehicle, it is equipped with a pair of ailerons 28 which are mounted to turn on oppositely inclined axes arranged symmetrically with respect to a vertical plane through the center line of the vehicle. These ailerons are represented as being of circular shape and are carried by shafts 29 which are rotatably mounted. Each shaft 29 has a wheel or sector 30 to which are connected two controlling cables 31 and 32. The disposition of the ailerons is controlled by the cables 31 and 32 which pass over sheaves suitably located in the main truss so that a movement of either aileron will cause an opposite movement of the other. In the form shown, the cable 31 has its opposite ends connected respectively to the wheels 30 of the aileron shafts. There are two cables 32 each of which has one end connected to the wheel 30 of its respective aileron, and after passing over sheaves 33 on the bearing 21, has its other end connected to an ear 34 on one of the arms of the handle bar 26, thus the control of the ailerons is accomplished by tilting of the handle bar on its trunnions, and as the sheaves 33 are located close to the axis of the bearing 21, the ailerons are not affected by any of the movements of the lever 20.

The operation of the ailerons is illustrated in Fig. 12, from which it will be seen that when the shafts 29 are rotated in opposite directions, one aileron will present its lower surface at a suitable angle of incidence to the air to be lifted while the other will present its upper surface at an angle of incidence so as to be depressed as indicated by the dotted lines in Fig. 12. This form of ailerons provides for perfect lateral balance at all angular positions of the ailerons, and also provides extreme accuracy and delicacy of adjustment. A fore and aft tilting of the plane 2, in addition to that which is accomplished by the steering mechanism, is accomplished by racking the body frame through the action of the diagonal braces 35 and 36 (see Fig. 6). These braces consist of cables which pass over sheaves at the front end of the body frame, and the forward end of each brace is connected to a lever 37 pivoted to the frame member 4 within convenient reach of the operator and provided with the usual notched sector and detent for locking it in any position. This vertical racking is useful for simultaneously changing the angles of incidence of both planes and is of great importance in starting and alighting. Since the plane 2 is a part of the supporting surface, such racking does not lift or lower the plane 2, as might at first appear to be the case, but it causes both planes to tilt simultaneously as if the whole machine were supported on two imaginary fulcrums respectively located at the centers of pressure of the planes 1 and 2. The racking of the body frame laterally for the purpose of shifting the steering plane 2 bodily toward either side of the line of flight irrespective of its angular adjustment for steering purposes is accomplished by manipulating the diagonal braces 38 at the top and bottom of the body frame. These braces are also in the form of cables having their rearward ends fastened to the respective rearward corners of the body frame and having their forward ends passed over sheaves and being then brought together and secured to a lever 39 which is shown pivoted on the longitudinal frame member 4 at the right of the operator's seat. This lateral racking of the body frame is particularly useful for the purpose of maintaining lateral balance by adjusting the planes to compensate for the effect of currents of air whose direction is at an angle to the direction of flight.

In addition to the adjustments of the steering plane 2 which have hereinbefore been mentioned, it is capable of being tilted on its universal joint about a horizontal axis parallel with the line of flight. This is accomplished by means of cables 40 connected to respectively opposite ends of the plane 2, and passing over sheaves on the frame to the drum 41 which is rotated by a hand wheel 42 within easy reach of the operator. This hand wheel should also be provided with a detent and notched sector, worm gearing, or other means, not shown, whereby it may be locked against accidental shifting in either direction. This movement of the plane 2 is useful for assisting in maintaining lateral balance at times when there is a wind blowing in a direction which is inclined laterally and upwardly or downwardly with respect to the line of flight and for steering upward or downward in a spiral course. The shaft or member 11 which carries the plane 2 is preferably tilted forward from an exactly vertical position, as illustrated, so that when the steering plane is rotated about said shaft for the purpose of steering, its advancing corner will tend to dip downward slightly, to reduce its lifting effect, and thereby compensate for the tendency of the main plane 1 to tilt upward on that side on account of its moving at a greater speed than the opposite side which is nearer to the center about which the turning takes place. This action opposes excessive banking in making a turn.

The alighting gear comprises front and rear pairs of wheels, extending below the framework of the vehicle and each yieldingly mounted so that any shock due to alighting will be taken up by shock-absorbing devices or buffers 43. Each pair of wheels is carried by a swinging frame hinged at one end to the main frame and the shock-absorbing buffers 43 are preferably in the form of air cushions shown in detail in Fig. 15. Each of these buffers comprises a cylinder 44 provided with a piston 45, the joint between the piston and the walls of the cylinder being carefully ground so as to make as nearly a perfect sliding fit as possible and prevent the escape of air around the piston. At the upper end of the cylinder there is an air inlet provided with a check valve 46 to prevent the escape of air, but arranged to permit the free inflow of air. The inlet preferably terminates in a nipple 47 of suitable form for attachment to an air pump so that the cylinder may be charged with air under pressure while the vehicle is supported on its wheels. In case it should happen that there is a slight leakage of air from the cylinders, the fact that the weight of the wheels and their swinging frames 48 is supported by the piston rods 50 while the vehicle is in flight insures that the pistons will normally settle to their lower limit of movement, as indicated in Fig. 15, through the fact that air may enter through the check valves 46. Then there will be a sufficent charge of air in the cylinders of the shock absorbers 43 to provide the desired cushioning of the shock in case the vehicle strikes the ground violently on alighting. The lower open end of each cylinder is protected by a diaphragm 51 formed of flexible dust-proof material which is of suitable form to permit the desired range of movement of the piston rod 50 without admitting dust to the cylinder.

The axles of the rear wheels are provided with suitable steering knuckles 52 arranged to permit the wheels to turn on vertical axes for steering the vehicle when traveling along the ground. These axles are also provided with steering arms connected by a link 53 so that the two wheels are turned simultaneously, as is the case with the front wheels of an automobile. Steering cables 54 connect with the link 53 and extend along respectively opposite sides of the frame, and are connected to an arm 55 mounted on the member 11 and rotatable therewith. The cables 54 are connected to the arm 55 in such manner that the guiding of the vehicle, both along the ground or when traveling through the air, will be accomplished by the same movement of the steering handle bar. In the form shown in the drawings, the propeller 56 is located at the front of the vehicle. The spring tension devices 57 are introduced into the running rigging so as to automatically take up any slack which might arise through variations in the tension on the respective cables. Where the strain on one cable is balanced by that on another, it is preferred to insert one of the spring tension devices 57 in the cable which does not receive the direct pull.

In order to avoid as much as possible resistances to the forward movement of the vehicle which have no lifting effect, all of the horizontal compression members of the frame which are disposed transversely to the line of flight are made of a section which is downwardly concave and of suitable curvature and disposition to obtain a lifting effect similiar to that of an aeroplane. This shape provides great strength for resisting compression strains with a small amount of material. In places where the compression strain is great, and where the compression members are long, they are preferably made of two or more parts 58 of similar curved transverse section spaced apart and connected by suitable latticed bracing.

The vertical compression members of the truss are preferably made of the usual ovate transverse section (shown in Fig. 11), so as to present a minimum amount of resistance to forward motion in proportion to the sectional area of the strut. No attempt has been made in the general view of the drawing to illustrate the sectional form of the struts and compression members, but this feature will be clearly understood from the detail views, Figs. 9, 10 and 11, in which the compression members are designated 58, the transverse struts 59 and the tension braces 60.

In order to insure equilibrium of the vehicle for the sake of safety in case the operator releases his grip on the controlling devices, springs 61 urge the handle bar to a horizontal position and springs 62 urge the controlling lever to a certain normal position. The springs 62 connect with a collar 63 which is swiveled on the controlling lever 20.

In order to steady the flight of the vehicle at all times and to insure that the vehicle will normally assume a soaring position, tending to cause it to glide downwardly in a forward direction, in case the motor should for any reason cease to operate, the vehicle is equipped with a horizontal soaring plane 64 preferably located above the aeroplanes 1 and 2. In the form shown, this soaring plane is in the shape of an isosceles triangle with its apex directed rearwardly and it is supported by frame bars extending along its edges. The side bars 65 are connected together at their rearward ends, and the rearward end of the frame thus formed is confined by two parallel horizontally disposed transverse members 66 of the body frame. The members 66 confine the end 67 against up and down movement relatively of said members, but permit said members to shift laterally during lateral racking of the body frame. It will be seen that the vertical racking of the body frame changes the angles of incidence of the planes 1 and 2 with respect to the plane 64 as a base.

In order to reduce the resistances which result from eddying of the air, as it leaves the rearward edge of the aeroplanes, the planes 1 and 2 are preferably made of such sectional shape that the rearward portions thereof will extend approximately parallel with the movement of the air particles after they leave the planes. Such sectional shape is illustrated in Fig. 19, the main or forward part 68 being downwardly concave and of suitable curvature to provide sufficient lifting effect, while the rearward portion 69 is substantially flat and disposed so as to be coincident with the direction in which the air particles would move after leaving the portion 68 if the rearward edge of the aeroplane were at 70. The angular relation between the portion 69 and the adjacent part of the portion 68 depends upon the width of the plane in the fore and aft direction, and upon the normal angle of incidence of the forward portion 68.

The operation of the device is as follows: The operator occupies the seat 8 and grasps the handle bar 26. Then by means of the lever 37 and the mechanism connected therewith, he may rack the body frame so as to set the planes 1 and 2 to any desired angle of incidence to the line of flight and to the plane 64. If the planes 1 and 2 are tilted so as to present a large angle of incidence, the machine will rise rapidly. The ability to thus set the planes makes it possible for the vehicle to rise from the ground when advancing at a comparatively low rate of speed. This racking of the frame also enables the operator to tilt the planes so as to offer a maximum resistance to forward movement on alighting and thus enables him to stop the advance of the vehicle more quickly than would be the case if the planes were not capable of such tilting movement. By racking the body frame, the operator may also set the aeroplanes so as to present a minimum resistance to the advance of the vehicle, as may be desirable when he wishes the vehicle to attain a certain speed along the ground prior to rising. After the vehicle has risen from the ground, the operator may, by means of the lever 37, set the planes to any desired angle of incidence, and may therefore obtain the necessary lifting effect for supporting the weight of the vehicle and its cargo so as to travel a level course at any desired speed of the engine throughout a very large range of speed variation. In steering the vehicle sidewise, the operator turns the handle bars 26 in exactly the same manner as if he were guiding a bicycle, and in steering up or down, and controlling fore and aft stability, he pulls the handle bar backward or pushes forward. The adjustment of the ailerons is accomplished by tilting the handle bar sidewise. Thus, all of these operations may be accomplished by simple movements of one controlling member in the operator's hands.

It will be noted that there are no vertical rudder surfaces and the action of the plane 2 in steering sidewise is not like the action of a vertical rudder cutting through the air, but when the plane 2 is turned toward one side, instead of acting like a vertical rudder and turning the head of the vehicle toward the same side, it deflects the air passing along it toward the opposite side, and as a result, slides edgewise in the direction toward which it is turned and swings the head of the vehicle toward the opposite side. The vehicle therefore, while traveling a curved horizontal course, also tends to rotate in a horizontal plane and in the same direction about a second center located at some point between the center of the planes 1 and 2; the result being a compounding of the two turning movements which causes the vehicle to turn in a much shorter distance than is possible with the usual forms of rudder surfaces. The usual vertical rudder surfaces produce the turning effect by an unbalanced drag which increases the resistance on one side of the center line, whereas the steering plane 2 produces the steering action by deflecting the air toward one side and at the same time reducing the resistance to the advance of the vehicle. This steering action is one of the most important features of the present invention, as it employs principles which have heretofore not been made use of in devices of this character, and as it avoids the great resistance which arises from the use of rudder planes in steering operations, and makes it possible to accomplish the steering operation without the use of other surfaces than are required for supporting a vehicle on the air. The absence of vertically disposed surfaces greatly reduces the side drift of the vehicle due to wind blowing across the line of flight. A further distinction between the principle of operation of the usual rudder and that of the steering plane and ailerons herein described will be seen from the fact that the usual rudder turns about an axis lying substantially in or near the plane of the rudder surface, whereas the steering plane 2 and the ailerons 28 are mounted to turn upon an axis which is inclined to the surface of such plane and which is closer to being at right angles to the surface than to being coincident therewith.

The lateral shifting of the steering plane 2, irrespective of its angular position with respect to the main plane 1, serves the important function of enabling the operator to compensate for the disturbance of the lateral balance due to wind blowing across the path of travel of the vehicle, particularly when the direction of the wind is inclined upwardly or downwardly, as well as laterally. Such air currents tend to tip the vehicle sidewise, and this effect can be offset by shifting the plane 2 laterally so as to shift the resultant center of lift of all of the planes to the corresponding side of the center of gravity of the vehicle. This sidewise shifting of the plane 2 is accomplished by racking the frame as hereinbefore described through the movement of the hand lever 39 which pulls on one of the horizontal diagonals at both the top and bottom of the body frame and slacks out to an equal degree on the other diagonal in each case. As this movement of the plane 2 is used mainly for compensating for the effect of transverse air currents, the mechanism for accomplishing it requires only occasional adjustment, and may therefore be independent of the main operating lever 23 by which are controlled the devices which require more or less constant and instantaneous adjustment.

The lateral tilting of the steering plane 2 by means of the hand wheel 42 may be employed for compensating for the effect of transverse air currents, but it also serves a very important steering function, and makes possible practically vertical ascent or descent by converting the longitudinal motion ordinarily required to obtain a lifting effect into a spiral motion which is similarly effective when the planes 1 and 2 are adjusted to proper angles of incidence and to proper relative angular positions about the longitudinal axis. When the plane 2 is tilted on the longitudinal axis, it coacts with the air in such manner as to cause the vehicle to rotate about an axis located between the effective centers of the planes 1 and 2, which, when the machine is gliding, will cause the descent to be in a spiral course. This same angular adjustment of the planes 1 and 2 about the longitudinal axis may also be utilized for checking a vertical descent. For instance, if the plane 2 is tilted toward one side, it would, during a vertical descent, act like the inclined vane of a windmill wheel, and cause the machine to rotate about a vertical axis during its descent. Then, after the machine has acquired a certain amount of momentum, if the plane 2 is tilted toward the opposite side, the machine would continue to turn in the same direction, but on account of the changed position of the plane 2, would rise in a spiral course until the momentum has been expended. On account of the action just described, this tilting of the plane 2 enables the operator to maintain lateral stability even without having headway as is required for such control by means of ailerons. This turning movement due to the tilting of the plane 2 on the longitudinal axis depends upon the same principle which is employed for horizontal steering by turning the plane 2 about a vertical axis.

The horizontal soaring plane 64 has the effect of causing the vehicle to maintain a certain attitude with respect to the plane of flight and insures that in traveling a level course the attitude of the vehicle will be substantially level. This is due to the fact that the plane 64 tends to move edgewise through the air, although during flight it also has an angle of incidence and provides lifting effect. At times when the propeller is stopped, the plane 64 will resist direct downward settling of the vehicle and will tend to tip forward so as to glide edgewise. This tendency, together with the support afforded by the aeroplanes 1 and 2, gives the vehicle a forward gliding movement which insures a sufficient speed of advance to enable the operator to have complete control of the movement of the vehicle by means of the steering devices. The disposition of the plane 64 on the body frame is such that it will, during flight, be presented to the air at a less angle of incidence than are the planes 1 and 2. This insures automatic fore and aft stability and prevents the vehicle from tipping forward and remaining in a position in which the planes 1 and 2 will fail to support the vehicle; since if the vehicle were to tip forward until the planes 1 and 2 lose their lifting effect, the plane 64 would be in such position that its upper surface would be presented at an angle of incidence tending to resist advance and to swing the vehicle back to a horizontal position.

When it is desirable to check the speed of advance of the vehicle, the planes 1 and 2 may be thrown simultaneously to a greater angle of incidence to the air by pulling inward on the lever 37 so as to shorten the diagonals 35 and lengthen the diagonals 36 of the body frame so as to rack it. This position of the parts is shown in Fig. 6. This racking of the body frame also enables both planes 1 and 2 to be simultaneously adjusted to the most desirable angle of incidence for any particular speed, and is also valuable for facilitating the alighting and starting operations, as it enables the operator to check the speed by means of the aeroplanes and also to alight so that all four wheels will simultaneously strike the ground. During this racking of the frame, the plane 64 tends to maintain the normal fore and aft attitude of the machine.

When the ailerons 28 are adjusted for the purpose of compensating for disturbances of lateral balance, the action of the air upon them is somewhat similar to that of the air on the steering surface 2 when the latter is turned in the act of steering. As the ailerons are rotated to an equal extent in opposite directions, one will off-set the other as regards tendency to turn the vehicle out of its course, and their action will therefore have the sole effect of tilting the vehicle laterally.

Although but one specific embodiment of this invention is herein shown and described, it will be understood that numerous details of the construction shown may be altered or omitted, within the scope of the following claims, without departing from the spirit of this invention.

I claim:—

1. An aerial vehicle, comprising aeroplanes arranged one behind another and each inclined to a line connecting their centers, one of said aeroplanes being mounted to turn relatively of another about an axis inclined upwardly and forwardly with respect to said line of centers whereby said one aeroplane will, when turned about said axis, dip sidewise in the direction toward which it is turned.

2. In an aerial vehicle, the combination of a main supporting plane, a horizontally disposed steering plane spaced behind said main supporting plane along the line of flight, said steering plane being downwardly concave and being adjustable angularly about an axis inclined upwardly and forwardly with respect to the line of flight.

3. In an aerial vehicle, the combination of aeroplanes placed one behind another along the line of flight and coacting to support the vehicle in the air, and means for shifting one of said aeroplanes bodily to one side of the line of flight without changing the angular disposition of said planes with respect to each other.

4. In an aerial vehicle, the combination of a main aeroplane structure adapted to support the vehicle on the air, an upright spaced away from said main aeroplane structure and located centrally thereof along the line of flight, a horizontally disposed aeroplane surface carried by said upright and coacting with said main structure in supporting the vehicle and adapted to be swung on said upright as an axis, a body frame carrying said upright, and means coacting with said body frame for raising and lowering said upright to simultaneously change the angles of incidence of said aeroplanes.

5. In an aerial vehicle, the combination of a main plane, a steering plane adjustable angularly with respect to the main plane for steering the vehicle, and means for bodily shifting said steering plane laterally with respect to the main plane irrespective of their angular relation.

6. In an aerial vehicle, the combination of a main plane, a horizontally disposed steering plane adjustable angularly with respect to the main plane for steering the vehicle, and means for bodily shifting said steering plane laterally with respect to the main plane irrespective of their angular relation.

7. In an aerial vehicle, the combination of a main plane, a steering plane adjustable angularly about a vertical axis with respect to the main plane for steering the vehicle, and means for shifting said steering plane laterally with respect to the main plane irrespective of their angular relation.

8. In an aerial vehicle, the combination of aeroplanes spaced apart along the line of flight, a frame connecting said aeroplanes and adapted to be distorted for shifting one of the aeroplanes with respect to another, one of said aeroplanes being mounted to have universal movement with respect to said frame.

9. In an aerial vehicle, the combination of aeroplanes spaced apart along the line of flight, a frame connecting said aeroplanes and adapted to be distorted for shifting one of the aeroplanes with respect to another, one of said aeroplanes being mounted to swing relatively to said frame on a vertically disposed axis in said frame.

10. In an aerial vehicle, the combination of an aeroplane, a frame secured thereto and extending along the line of flight, a steering plane mounted on said frame, and means for distorting said frame laterally to carry said steering plane to one side of the fore and aft center line of the vehicle to maintain lateral balance.

11. In an aerial vehicle, the combination of an aeroplane, a frame secured thereto and extending along the line of flight, a steering plane mounted to have universal movement on said frame, and means for distorting said frame for changing the position of said steering plane with respect to said aeroplane.

12. In an aerial vehicle, the combination of an aeroplane, a frame secured thereto and extending along the line of flight, a steering plane mounted on said frame, means for distorting said frame, and separate means for controlling the angular position of said steering plane with respect to said aeroplane irrespective of the distortion of said frame.

13. An aerial vehicle, comprising aeroplanes spaced apart along the line of flight, a motor mounted in fixed relation to one of said aeroplanes, a frame connecting said aeroplanes and including a parallelogram of vertically and horizontally disposed members hinged together and adapted to be racked for simultaneously changing the angles of incidence of said planes with respect to the air.

14. An aerial vehicle, comprising aeroplanes spaced apart along the line of flight, a motor mounted in fixed relation to one of said aeroplanes, a frame connecting said aeroplanes and including a parallelogram of vertically and horizontally disposed members hinged together and adapted to be racked for simultaneously changing the angles of incidence of said planes with respect to the air, and means adapted to be controlled by an operator for racking said parallelogram.

15. In an aerial vehicle, the combination of an aeroplane, a frame secured to said aeroplane and extending in the general direction of the line of flight, a second aeroplane mounted to have universal movement on said frame, means for distorting said frame for the purpose of shifting the center of the universal movement of said guiding plane, and means for controlling the angular movement of said second aeroplane about said center of universal movement.

16. In an aerial vehicle, the combination of means for supporting the vehicle on the air, means comprising an aeroplane for steering the vehicle, means for maintaining lateral balance of the vehicle, a lever mounted to swing on a transverse axis and to rotate about its own axis, mechanism connecting said lever with said steering means for steering the vehicle sidewise through the rotation of said lever on its own axis and for steering the vehicle upward and downward through the swinging of said lever on said transverse axis, a handle bar mounted on said lever and adapted to swing thereon about an axis transverse to said transverse axis of said lever, and mechanism connecting said handle bar with said balancing means and adapted to operate said balancing means through the tilting of said handle bar on said lever.

17. An aerial vehicle, comprising aeroplanes spaced apart along the line of flight, a motor mounted in fixed relation to one of said aeroplanes, a frame connecting said aeroplanes and including a parallelogram of vertically and horizontally disposed members hinged together and adapted to be racked for simultaneously changing the angles of incidence of said planes with respect to the air, and a soaring plane mounted on said frame in substantially fixed angular relation to the horizontal members of said parallelogram.

18. An aerial vehicle, comprising aeroplanes spaced apart along the line of flight, a motor mounted in fixed relation to one of said aeroplanes, a frame connecting said aeroplanes and including a parallelogram of vertically and horizontally disposed members hinged together and adapted to be racked for simultaneously changing the angles of incidence of said planes with respect to the air, and a triangular soaring plane mounted on said frame in substantially fixed angular relation to the horizontal members of said parallelogram.

19. An aerial vehicle, comprising aeroplanes spaced apart along the line of flight, a motor mounted in fixed relation to one of said aeroplanes, a frame connecting said aeroplanes and including a parallelogram of vertically and horizontally disposed members hinged together and adapted to be racked for simultaneously changing the angles of incidence of said planes with respect to the air, and a soaring plane mounted on said frame in substantially fixed angular relation to the horizontal members of said parallelogram, said soaring plane being in the shape of an isosceles triangle with its base at the front and its apex at the rear.

20. In an aerial vehicle, the combination of a supporting frame, comprising a rectangular parallelepiped including horizontal and vertical members hinged together and adapted to be racked both vertically and horizontally, an aeroplane structure comprising front and rear aeroplanes, secured respectively to the front and rear uprights of said parallelepiped, and a soaring plane in the form of an isosceles triangle having its base secured to the front uprights of said parallelepiped and having its apex connected adjacent to the rear uprights, but horizontally slidable relatively thereto, whereby said soaring plane will be movable with the upper part of said parallelepiped during vertical racking thereof, and will permit the parallelepiped to be freely racked horizontally without interference by said soaring plane.

Signed at Chicago this 2nd day of March. 1910.

JAMES S. STEPHENS.

Witnesses:
 EUGENE A. RUMMLER,
 EDWIN PHELPS.

Copies of this patent may be obtained for five cents each, by addressing the "Commissioner of Patents, Washington, D. C."